(12) United States Patent
Wepfer

(10) Patent No.: US 12,074,483 B2
(45) Date of Patent: Aug. 27, 2024

(54) GENERATOR AND METHOD FOR DISASSEMBLING A GENERATOR OF A DIRECTLY DRIVEN WIND TURBINE

(71) Applicant: Wepfer Technics AG, Andelfingen (CH)

(72) Inventor: Hans Wepfer, Berg-Daegerlen (CH)

(73) Assignee: WEPFER TECHNICS AG, Andelfingen (CH)

( * ) Notice: Subject to any disclaimer, the term of this patent is extended or adjusted under 35 U.S.C. 154(b) by 13 days.

(21) Appl. No.: 17/784,781

(22) PCT Filed: Dec. 11, 2020

(86) PCT No.: PCT/EP2020/085790
§ 371 (c)(1),
(2) Date: Jun. 13, 2022

(87) PCT Pub. No.: WO2021/166425
PCT Pub. Date: Jun. 17, 2021

(65) Prior Publication Data
US 2023/0102928 A1 Mar. 30, 2023

(30) Foreign Application Priority Data
Dec. 12, 2019 (EP) .................................... 19215709

(51) Int. Cl.
*F03D 13/00* (2016.01)
*B60L 53/52* (2019.01)
(Continued)

(52) U.S. Cl.
CPC .......... *H02K 15/0006* (2013.01); *B60L 53/52* (2019.02); *F03D 9/25* (2016.05);
(Continued)

(58) Field of Classification Search
CPC ...... H02K 15/0006; H02K 1/28; H02K 7/003; H02K 7/083; H02K 7/1838; H02K 5/161;
(Continued)

(56) References Cited

U.S. PATENT DOCUMENTS 4,527,072 A * 7/1985 van Degeer ............ F03D 80/50
416/165
5,844,341 A 12/1998 Spooner et al.
(Continued)

FOREIGN PATENT DOCUMENTS

| EP | 2463510 A1 * | 6/2012 | ............ B23P 11/022 |
| EP | 2463510 A1 | 6/2012 | |
| EP | 2816225 B1 | 11/2016 | |

OTHER PUBLICATIONS

International Search Report (With English Translation) and Written Opinion (With Machine Translation) issued on Mar. 12, 2021 in corresponding International Patent Application No. PCT/EP2020/085790; 19 pages.

*Primary Examiner* — Joseph Ortega
(74) *Attorney, Agent, or Firm* — Maier & Maier, PLLC

(57) ABSTRACT

A generator for a direct driven wind turbine configured to convert kinetic energy of a main shaft of the wind turbine into electrical energy. The generator includes a generator rotor connectable to the main shaft of the wind turbine and a generator stator, the generator includes a generator housing on which the generator stator is arranged. The generator housing includes a front side facing towards a rotor head of the wind turbine in an installed state of the generator and a rear side facing away from the rotor head in the installed state of the generator. The generator includes at least one front generator bearing arranged at the front of the generator housing and a rear generator bearing arranged at the rear of the generator housing.

20 Claims, 4 Drawing Sheets

(51) Int. Cl.
*F03D 9/25* (2016.01)
*F03D 80/50* (2016.01)
*F03D 80/70* (2016.01)
*H02K 1/28* (2006.01)
*H02K 7/00* (2006.01)
*H02K 7/08* (2006.01)
*H02K 7/18* (2006.01)
*H02K 15/00* (2006.01)
*B63B 35/44* (2006.01)

(52) U.S. Cl.
CPC ............ *F03D 13/00* (2016.05); *F03D 80/50* (2016.05); *F03D 80/504* (2023.08); *F03D 80/703* (2023.08); *H02K 1/28* (2013.01); *H02K 7/003* (2013.01); *H02K 7/083* (2013.01); *H02K 7/1838* (2013.01); *B63B 2035/446* (2013.01); *B63B 2209/20* (2013.01); *F05B 2220/30* (2013.01); *F05B 2220/706* (2013.01)

(58) Field of Classification Search
CPC . B60L 53/52; F03D 9/25; F03D 13/00; F03D 80/50; F03D 80/504; F03D 80/703; F03D 80/70; F03D 15/20; B63B 2035/446; B63B 2209/20; F05B 2220/30; F05B 2220/706; F05B 2220/7066; F05B 2230/70; F05B 2260/79; Y02E 10/72; Y02P 70/50; F16C 2360/31
See application file for complete search history.

(56) References Cited

U.S. PATENT DOCUMENTS

| | | |
|---|---|---|
| 2008/0309086 A1 | 12/2008 | Taksichi et al. |
| 2010/0253087 A1 | 10/2010 | Lauke |
| 2013/0221677 A1 | 8/2013 | Hinken |
| 2014/0361547 A1* | 12/2014 | Alti Barbon .............. F03D 9/25 290/55 |

* cited by examiner

GENERATOR AND METHOD FOR DISASSEMBLING A GENERATOR OF A DIRECTLY DRIVEN WIND TURBINE

TECHNICAL FIELD

The invention relates to a generator for a direct driven wind turbine. The invention further relates to a direct driven wind turbine with such a generator and to a method for disassembling a generator from a main shaft of a direct driven wind turbine.

BACKGROUND

Wind energy or wind power has been used as an energy source for a long time. Wind energy is considered one of the most promising renewable energy sources due to its worldwide availability, its low costs and its level of technological development.

Especially in the course of the climate debate, wind energy is gaining additional importance as a renewable energy source. Thus, wind energy is one of the most environmentally friendly, cleanest and safest energy resources. In the scientific literature, its use—also in comparison with other renewable energies—is counted among the most environmentally friendly forms of energy generation.

By far the most important form of wind energy use is by means of wind turbines.

Wind turbines or wind energy plants convert the energy of the wind into electrical energy, which is then fed into an electricity grid. A wind turbine basically consists of a rotor with a hub and rotor blades, as well as a machine nacelle that houses a generator and a gearbox. The machine nacelle is mounted on a tower and the generator is connected to the rotor via a main shaft.

Recently, there has been a trend for more and more manufacturers to use a gearless design for wind turbines. These so-called direct driven wind turbines do not use a gearbox. The generator is operated directly with the speed of the wind turbine rotor.

Such a direct driven wind turbine is known from EP 2 816 225 B1. The wind turbine has a generator comprising an outer rotor with an outer annular body and an inner stator. A plurality of blade supporting structures are arranged on various outer circumferential parts of the outer annulus, which are connected to blade roots of turbine blades. A horizontal shaft is connected to the outer rotor such that the outer rotor rotates around the inner stator. The wind turbine known from EP 2 816 225 B1 further comprises a nacelle mounted on an upper part of a tower and housing a shaft support mechanism for supporting the horizontal shaft. Furthermore, a pitch adjustment is made directly on the turbine blades.

In the case of the known wind turbines, such as those known from EP 2 816 225 B1, there is a problem in that they have a complicated structure. This initially leads to the fact that it is generally complicated to build and assemble the known wind turbines. Consequently, there are already high manufacturing and assembly costs. In addition, due to the complicated construction, maintenance and servicing is only possible with difficulty and is associated with increased effort. Thus, in addition to the high manufacturing costs, the known wind turbines also incur high follow-up costs.

Based on this, a wind turbine would therefore be desirable that has a more compact design and is thus simplified to manufacture and assemble. At the same time, a design that enables easier maintenance and servicing would be desirable. In the case of direct driven wind turbines, the construction of the wind turbine also depends in particular on the construction and implementation of the generator, so that it would furthermore be desirable here to design it in such a way that it enables and supports the aspects mentioned above.

SUMMARY

It is therefore the object of the invention to provide a generator for a direct driven wind turbine which allows simplified manufacture, assembly, maintenance and servicing.

The solution according to the invention is to provide a generator for a direct driven wind turbine which is configured to convert kinetic energy of a main shaft of the wind turbine into electrical energy, whereby the generator comprises a generator rotor connectable to the main shaft of the wind turbine and a generator stator, whereby the generator comprises a generator housing on which the generator stator is arranged, whereby the generator housing comprises a front side facing towards a rotor head of the wind turbine in an installed state of the generator and a rear side facing away from the rotor head in the installed state of the generator, whereby the generator further comprises at least one front generator bearing arranged at the front of the generator housing and a rear generator bearing arranged at the rear of the generator housing, whereby the front and rear generator bearings are configured to support the main shaft on the generator housing in the installed state of the generator, whereby the generator comprises at least one support device which is configured to support the generator housing on a housing of the wind turbine in the installed state.

Direct driven wind turbines are referred to here as gearless plants. The wind turbine is preferably a wind turbine with an at least substantially horizontal axis. Accordingly, the main shaft is also arranged at least substantially horizontally. The main shaft is the rotor shaft of the wind turbine, which is set in rotation by means of the rotor blades.

Alternatively, it can also be a wind turbine that has a vertically positioned rotor axis. In this case, the main shaft is also arranged at least substantially vertically.

The generator can convert the rotational energy of the main shaft into electrical energy when installed in the wind turbine. For this purpose, the generator has the generator rotor and the generator stator. The generator rotor is a rotating part of the generator. The generator stator is a stationary part of the generator. Due to the rotating magnetic DC field generated by the generator rotor, for example with a permanent magnet or an electromagnet, electrical voltage is induced in the conductors or conductor windings of the generator stator by the Lorentz force.

The generator stator is arranged on the generator housing. The generator housing and the generator stator can be one single component, so that the stator is also designed as the generator housing. Alternatively, the generator stator is a separate component that is held by the generator housing.

The frontside and rearside of the generator housing refer to the condition when the generator is installed in the wind turbine. Thereby, the side that faces the rotor of the wind turbine is referred to as the frontside. However, the generator can be designed symmetrically in such a way that it can be placed on the main shaft from both sides. Accordingly, the frontside can be more generally referred to as a first side of the generator and the opposite side (rearside) can be referred to as a second side of the generator.

The same applies to all other components where a front component and a rear component are specified. Such indications always refer to a condition installed in the wind turbine and can be replaced throughout the description by first or second component.

Accordingly, for example, the front generator bearing could also be referred to as the first generator bearing and the rear generator bearing could also be referred to as the second generator bearing.

Between the front generator bearing and the rear generator bearing is an area in which the generator rotor extends radially outwards. The at least one support device is configured to be able to dissipate bending moments of the main shaft in the mounted state. In particular, the support device then directs moments and forces into the housing of the wind turbine.

With the generator according to the invention, the object is solved in a satisfactory manner. In particular, the structure of the generator described above enables a particularly compact structure of the wind turbine. This compact construction is extended and improved by the following further embodiments.

According to an advantageous further embodiment of the invention, the front and rear generator bearings are configured as floating bearings.

The floating bearings here only transmit radial forces. This means that the front and rear generator bearings only transmit radial forces from the main shaft to the generator housing. The two generator bearings are thus axially respectively horizontally displaceable and can absorb respectively compensate axial length changes of the main shaft in the installed state. Such axial length changes can occur, for example, due to heat.

The front and rear generator bearings are preferably designed as roller bearings. Alternatively, however, they can also be designed as plain bearings.

According to an advantageous further embodiment of the invention, the generator rotor comprises a hollow cylindrical base portion having an inner peripheral surface and an outer peripheral surface.

With a hollow cylindrical base portion, power can be transmitted between the main shaft and generator rotor over a relatively large area.

According to an advantageous further embodiment of the invention, the generator rotor is formed in one piece with the hollow cylindrical base portion.

This has the advantage that the generator rotor is arranged directly, i.e. straight on the main shaft. Furthermore, the number of components is reduced and a particularly stable configuration of the generator is achieved. The generator rotor then preferably has a part extending radially outwards from the base area. This part extending radially outwards is, viewed in the axial direction, particularly preferably arranged centrally on the hollow cylindrical base portion.

Alternatively, the generator rotor can also be designed in two parts, whereby the part extending radially outwards is then fastened to the hollow cylindrical base portion (form-fitting, force-fitting and/or material-fitting).

According to an advantageous further embodiment of the invention, an inner peripheral surface of the front generator bearing and an inner peripheral surface of the rear generator bearing come into contact with the outer peripheral surface of the hollow cylindrical base portion.

Furthermore, an outer peripheral surface of the front generator bearing and an outer peripheral surface of the rear generator bearing come into contact with the generator housing.

Transferred to a rolling bearing, this means that an inner ring of the rolling bearing comes into contact with the hollow cylindrical base portion and an outer ring of the rolling bearing comes into contact with the generator housing.

Overall, this means that the main shaft is supported by the generator housing via the generator rotor. The generator housing is in turn supported by the housing via the at least one support device.

The flow of force therefore goes from the main shaft to the generator rotor or the base portion of the generator rotor. Further, the force flow goes from the base portion to the generator bearing. Further, the force flow goes from the generator bearing to the generator housing. Further, the force flow goes from the generator housing to the at least one support device. Further, the force flow goes from the at least one support device to the housing.

This means that the main shaft is not supported directly via the generator bearings, but indirectly via the generator rotor or the base portion thereof. Therefore, the base portion of the generator rotor is formed longer in the axial direction than the axial distance between the front generator bearing and the rear generator bearing. In particular, the generator rotor extends in an axial and forward (to the frontside) direction beyond the front generator bearing and in an axial and rearward (to the rearside) direction beyond the rear generator bearing.

This has the decisive advantage that the entire generator can be plugged onto the main shaft as a generator module. On the one hand, this in turn brings the advantage that the generator rotor can be assembled as a module and then mounted on the main shaft. Here, therefore, a modular production of the wind turbine can take place. On the other hand, this also has the advantage that the generator can be assembled and disassembled easily (i.e. in a few uncomplicated steps). Maintenance and repair can therefore be simplified here.

According to an advantageous further embodiment of the invention, the generator further comprises a front generator rotor fastening device and a rear generator rotor fastening device which are arranged at axial end portions of the hollow cylindrical base portion.

The front and rear generator rotor fastening devices are configured to fasten the generator rotor to the main shaft in the mounted state. The front generator rotor fastening device is arranged axially in front of the front generator bearing. The rear generator rotor fastening device is arranged axially behind the rear generator bearing. The generator rotor fastening devices allow the generator rotor to be held securely on the main shaft.

According to an advantageous further embodiment of the invention, the front generator rotor fastening device and the rear generator rotor fastening device are configured as clamping devices.

If the generator rotor fastening devices are configured as clamping devices, they can be mounted and dismounted especially quickly, so that a very fast generator change can be carried out. Preferably, the clamping devices are clamping rings that further enhance this effect.

According to an advantageous further embodiment of the invention, the at least one support device is an elastomeric bearing.

The elastomer bearing is particularly well suited to absorb bending moments of the main shaft. The advantage of the elastomeric bearing is that, as a deformation bearing, it absorbs forces by deforming the bearing material (in this case elastomer). Preferably, the elastomer of the elastomeric bearing is made of a natural rubber compound. This enables a highly elastic elastomeric bearing that is protected against ageing and ozone.

According to an advantageous further embodiment of the invention, a front support device is arranged on the frontside of the generator housing and a rear support device is arranged on the rearside of the generator housing.

According to an advantageous further embodiment of the invention, the front support device is connected to the frontside of the generator housing via a front generator housing fastening device, whereby the rear support device is connected to the rearside of the generator housing via a rear generator housing fastening device.

If two support devices, namely a front support device and a rear support device, are arranged, an optimal distribution of the forces on the front and rear generator bearing can be achieved.

It is a further object of the invention to provide a wind turbine which has a more compact structure and at the same time enables simplified manufacture, assembly, maintenance and servicing.

In this regard, the solution according to the invention further provides a direct driven wind turbine comprising: one of the generators described above; a main shaft which transmits rotation of a rotor head to the generator; and a housing on which the main shaft and the generator are supported.

With regard to the wind turbine, all aspects and advantages already discussed in relation to the generator apply. A detailed repetition of this will therefore be dispensed with.

The main shaft is preferably a horizontal main shaft. This means that the main shaft is installed horizontally within the wind turbine. Alternatively, it can also be a vertical main shaft. Rotor blades are arranged on the rotor head. The rotor head is designed as a hub and is mounted on the main shaft.

The housing can be a nacelle of the wind turbine. Preferably, however, the housing is a machine housing that is inserted into the nacelle. The housing preferably has a cage structure with at least one base plate.

With the wind turbine according to the invention, the task is solved in a satisfactory manner. In particular, it is possible to achieve simplified manufacture, assembly, maintenance and servicing.

According to an advantageous further embodiment of the invention, the direct driven wind turbine further comprises a front main shaft bearing which is arranged adjacent to the rotor head and which is configured to support the main shaft on the housing.

According to an advantageous further embodiment of the invention, the front main shaft bearing is configured as a fixed bearing.

Since the front main shaft bearing is configured as a fixed bearing, it can absorb radial and axial forces. If the front main shaft bearing is configured as a fixed bearing, the rear main shaft bearing can be configured as a floating bearing. This means that the front and rear generator bearings can be configured as floating bearings. This reduces the overall design complexity of the generator.

Preferably, the front main shaft bearing is a self-aligning ball bearing. In a self-aligning ball bearing, the inner ring, cage and balls can be pivoted a few angular degrees from the centre position. In this way, misalignments or deflections of the shaft can be compensated by the self-aligning bearing.

According to an advantageous further embodiment of the invention, the front and rear generator bearings together form a rear main shaft bearing.

This has the advantage that no additional rear main shaft bearing is required. The generator (resp. the generator bearings) thus also has the task of supporting the main shaft. Since several functions are fulfilled by one component, the number of components can be reduced. This in turn reduces the overall complexity of the system resp. of the wind turbine.

According to an advantageous further embodiment of the invention, the wind turbine further comprises a main shaft holder adapted to hold the main shaft in position when the generator is disassembled.

When the generator is disassembled from the main shaft, the main shaft is initially no longer supported at a rear area of the wind turbine. The main shaft is therefore no longer supported at a rear area. Due to the weight of the rotor head, rotor blades etc. on a front area of the main shaft, the main shaft is pressed down at the front. Correspondingly, the rear area of the main shaft is pressed upwards. The main shaft holder now serves to hold the rear area of the main shaft, i.e. to press it down.

Preferably, the main shaft holder is arranged adjacent to the generator resp. adjacent to an installation position of the generator. Here the main shaft holder can act on the main shaft with a relatively large lever.

According to an advantageous further development of the invention, the main shaft is designed as a hollow shaft.

First of all, this has the advantage that cables and similar elements that are to be routed from a front area of the wind turbine to a rear area of the wind turbine can be laid through the main shaft. On the one hand, this provides a protected arrangement and, on the other hand, it also saves space.

According to an advantageous further development of the invention, the wind turbine has a pitch device.

Pitch is hereby understood as the inclination or the angle of inclination of the rotor blades. It is possible to change the pitch by means of a pitch device. In this way, the power of the wind turbine can be controlled or regulated in order to optimise its efficiency with changing wind speeds. In detail, a variable rotor speed can be achieved so that the rotor can always be operated at the aerodynamically optimal speed below the rated power. Furthermore, lower loads are exerted on the generator due to reduced torque fluctuations and lower noise emissions are emitted due to low rotor speeds. In addition, torque fluctuations can be reduced by using the rotor as a flywheel during gusts.

According to an advantageous further embodiment of the invention, the pitch device comprises a pitch cylinder, a pitch rod and a pitch adjustment, whereby the pitch adjustment is arranged adjacent to the rotor head and is controllable by means of the pitch cylinder (in order to change the pitch of the rotor blades) and whereby the pitch rod connects the pitch cylinder to the pitch adjustment through the main shaft.

One disadvantage of using the known pitch devices is that the wind turbine is more complex than simpler constructions without pitch devices. Furthermore, the pitch device usually must be installed on the rotor head in a complex manner.

However, with the construction described above, this disadvantage can be reduced. In detail, this can be reduced by distributing the pitch device at several locations within the wind turbine. In particular, due to the hollow shaft, it is possible to arrange the pitch cylinder in a rear area of the wind turbine and to arrange the pitch adjustment at a front area of the wind turbine. The pitch cylinder is connected to the pitch adjustment via a pitch rod.

Particularly preferably, the pitch rod is (at the same time) a safety device configured to hold the main shaft in case it should break. Accordingly, the pitch rod also serves as a safety device that increases the operational safety of the wind turbine. For this purpose, the pitch rod is configured to be stable enough to hold the main shaft (if it should break).

It is a further object of the invention to provide a method for disassembling a generator which allows a simplified disassembly of the generator.

The solution according to the invention is to provide a method for disassembling a generator from a main shaft of a direct driven wind turbine, comprising the steps of: loosening a front generator rotor fastening device and loosening a rear generator rotor fastening device; loosening at least one, preferably several, support devices; and sliding down the generator from the main shaft.

With the method according to the invention, the object is solved in a satisfactory manner. With the method according to the invention, the task is solved in a satisfactory manner. In particular, it is possible to achieve simplified disassembly with this method, so that maintenance and servicing in particular can be simplified.

When the front and rear generator rotor fastening device(s) and support device(s) are loosened, the entire generator can be pushed off the main shaft. This allows a particularly quick disassembly of the generator.

In particular, this is made possible on the one hand by an inner peripheral surface of the front generator bearing and an inner peripheral surface of the rear generator bearing coming into contact with the outer peripheral surface of the hollow cylindrical base portion. On the other hand, this is made possible by an outer peripheral surface of the front generator bearing and an outer peripheral surface of the rear generator bearing come into contact with the generator housing. More generally, this means that the above effect can be achieved by the main shaft being supported on the generator housing via the generator rotor.

The method may further comprise, preferably as a first step, a step of removing a pitch cylinder of the wind turbine.

Analogously, a method for mounting the generator on a main shaft of a direct driven wind turbine can also be specified, whereby the method then comprises the following steps: sliding the generator onto the main shaft; fixing at least one, preferably several, support devices; and fixing a front generator rotor fastening device and fixing a rear generator rotor fastening device.

Preferably, the generator is one of the generators described above. Thus, all aspects and advantages already discussed in connection with the generator also apply here. A detailed repetition of this will therefore be dispensed with.

According to an advantageous further embodiment of the invention, the method further comprises the following step: activating a main shaft holder.

The main shaft holder, once activated, can hold the main shaft such that it cannot move uncontrollably after the generator is removed. The main shaft holder thus holds the main shaft in a predetermined position (for example, the original position) when the generator is removed.

Preferably, the main shaft holder is arranged adjacent to the generator resp. an installation position of the generator. Here the main shaft holder can act on the main shaft with a relatively large lever.

The housing may further preferably have a rail on which the generator can be pulled from the main shaft. The rail simplifies the disassembly and assembly of the generator on the wind turbine.

The invention is explained in more detail below by describing examples of embodiments with reference to the accompanying drawings. Thereby, further advantageous embodiments and combinations of features of the invention result from the following description and the entirety of the patent claims.

DETAILED DESCRIPTION

In the following, reference is first made to FIG. 1, which shows a schematic cross-sectional view of a wind turbine 1000 according to the present invention. The tower and the nacelle of the wind turbine 1000 are not shown in the figures.

Figure 1:
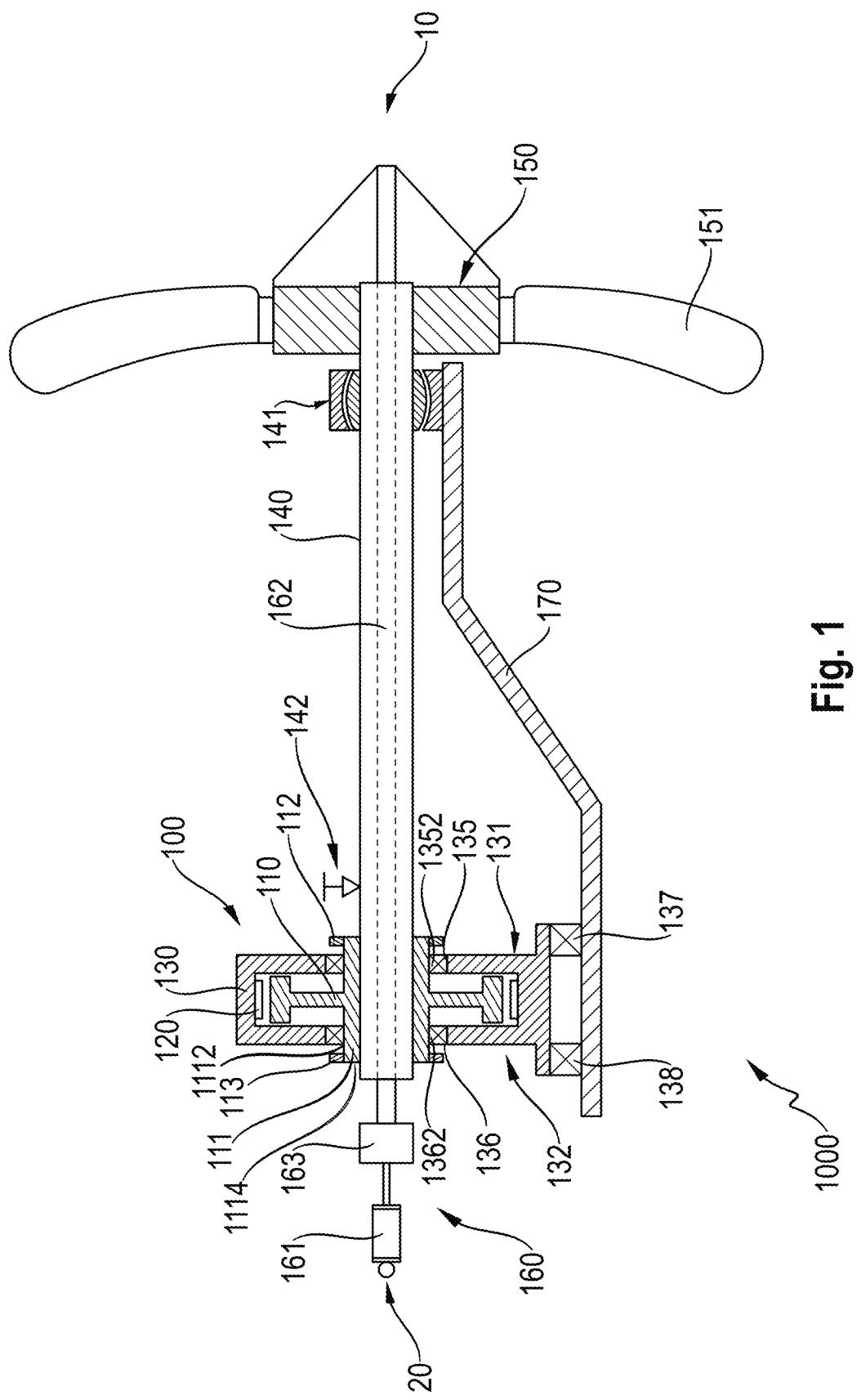
FIG. 1 a schematic cross-sectional view of a wind turbine according to the present invention.

For descriptive purposes, a front area (frontside 10) and a rear area (rearside 20) are defined in FIG. 1. These directions are used throughout the description and also to describe individual components whose overall arrangement is shown in FIG. 1. The front area (frontside 10) is on the right in FIG. 1 and the rear area (rearside 20) is on the left in FIG. 1. Accordingly, an upper region is defined as upper in FIG. 1 and a lower region is defined as lower in FIG. 1. The axial direction is defined as the direction of the axis of rotation of the wind turbine 1000. The axial direction in FIG. 1 is a horizontal direction.

In the front section, the wind turbine 1000 comprises a rotor head 150. The rotor head 150 carries the rotor blades 151. The rotor head 150 carries the rotor blades 151. Typically, three rotor blades 151 are arranged on the rotor head 150. The rotor head 150 is formed as a hub such that it can be pushed or placed onto a shaft.

Here, the rotor head 150 is pushed resp. set onto a main shaft 140. Accordingly, a rotation of the rotor head 150, which is set in motion by means of the rotor blades 151, can be transmitted to the main shaft 140. The main shaft 140 extends in axial direction resp. in horizontal direction.

Since the main shaft 140 rotates relative to other components of the wind turbine 1000 (housing, nacelle, . . . ), the main shaft 140 must be supported accordingly. For this purpose, the wind turbine 1000 initially has a front main shaft bearing 141 as the first bearing point. The front main shaft bearing 141 is formed near the rotor head 150. That is, the main shaft bearing 141 is arranged in the front area, i.e. close to the frontside 10.

The main shaft bearing 141 is designed as a fixed bearing and can therefore absorb radial forces and axial forces. Here, the main shaft bearing 141 is shown and designed as a self-aligning bearing.

As can also be seen in FIG. 1, the wind turbine 1000 further comprises a generator 100. As already mentioned, the second bearing position of the main shaft 140 is thereby implemented together with the bearing of the generator 100.

The generator 100 comprises a generator rotor 110 and a generator stator 120. The generator rotor 110 is arranged on the main shaft 140. The generator rotor 110 is arranged on the main shaft 140. More specifically, the generator rotor 110 comprises a base portion 111 arranged on the main shaft 140.

The base portion 111 is formed in a hollow cylindrical shape and has an inner peripheral surface 1114 and an outer peripheral surface 1112. With the inner peripheral surface 1114, the base area 111 is arranged on the outer peripheral surface of the main shaft 140. The inner peripheral surface 1114 of the base portion 111 and the outer peripheral surface of the main shaft 140 are configured relative to each other in such a way that rotation of the main shaft 140 can be transmitted to the base portion 111 and thus to the generator rotor 110. This shaft-hub connection for transmitting the rotation can be of a non-positive type (for example by means of clamping elements; clamping elements; cones) or of a form-fit type (for example by means of feather keys; dowel pins; polygonal profiles; toothing).

As shown in FIG. 1, the generator 100 further comprises a front generator rotor fastening device 112 and a rear generator rotor fastening device 113. Both generator rotor fastening devices 112 and 113 serve to securely fasten the generator rotor 110 to the main shaft 140. Preferably, the generator rotor fastening devices 112 and 113 are clamping rings. These have the particular advantage of enabling quick and easy assembly and disassembly.

The front generator rotor fastening device 112 is arranged at a front axial end portion of the base portion 111, i.e. towards the frontside 10. The rear generator rotor fastening device 113 is arranged at an opposite end region, i.e. a rear axial end region of the base portion 111, i.e. towards the rearside 20.

The generator rotor 110 extends radially outwardly from the base portion 111. In particular, the generator rotor 110 extends radially outwards at a region which, viewed in the axial direction (axis of rotation), is arranged between the rear generator rotor fastening device 113 and the front generator rotor fastening device 112. Preferably, this area is arranged centrally on the base portion 111 as seen in the axial direction.

Preferably, the generator rotor 110 and the base portion 111 are formed in one piece. The radially outwardly extending part of the generator rotor 110 is surrounded by a generator housing 130, as shown in FIG. 1. The generator stator 120 is also arranged on the generator housing 130. This means that the generator housing 130 first serves to support the generator stator 120. Even though the generator stator 120 and generator housing 130 are described here as two different components, they can also be formed in one piece.

The generator housing 130 may have a plurality of cooling fins on an outer side (side facing outwards) which serve to cool the generator 100. However, these are not shown in the figures.

The generator housing 130 has a frontside 131 and a rearside 132. The front 131 of the generator housing 130 faces the front 10. The rearside 132 of the generator housing 130 faces the rearside 20. A front generator bearing 135 is disposed on the frontside 131 of the generator housing 130. A rear generator bearing 136 is arranged at the rearside 132 of the generator housing 130. This means that the generator housing 130 is supported by means of two generator bearings 135 and 136. As indicated in FIG. 1, the generator bearings 135 and 136 are designed as floating bearings. The generator bearings 135 and 136 are at least substantially ring-shaped.

As also shown in FIG. 1, the generator bearings 135 and 136 are seated on the hollow cylindrical base portion 111 of the generator rotor 110. This means that an inner peripheral surface of the generator bearings 135 and 136 (generator bearing 135 having an inner peripheral surface 1352, and generator bearing 136 having an inner peripheral surface 1362) is in contact with the outer peripheral surface of the hollow cylindrical base portion 111.

Further, an outer peripheral surface of the generator bearings 135 and 136 is in contact with the generator housing 130. More specifically, the front generator bearing 135 is seated in the frontside 131 of the generator housing 130 and the rear generator bearing 136 is seated in the rearside 132 of the generator housing 130.

The main shaft 140 is therefore mounted on the generator housing 130 via the generator rotor 110. This means that the main shaft 140 is not mounted directly via the generator bearings 135 and 136, but indirectly via the generator rotor 110.

As can be seen in FIG. 1, the base portion 111 of the generator rotor 110 is longer in the axial direction than the axial distance between the front generator bearing 135 and the rear generator bearing 136.

Viewed from the frontside 10 to the rearside 20, first the front generator rotor fastening device 112, then the front generator bearing 135, then the radially outwardly extending portion of the generator rotor 110, then the rear generator bearing 136, and then the rear generator rotor fastening device 113 are arranged on the base portion 111.

This means that all of the aforementioned elements are not arranged directly on the main shaft 140. Rather, the aforementioned elements are arranged on the generator rotor 110, more precisely on the base portion 111 thereof.

Accordingly, these can be pulled off the main shaft 140 together with the generator rotor 110 and do not have to be dismounted individually.

Figure 2:
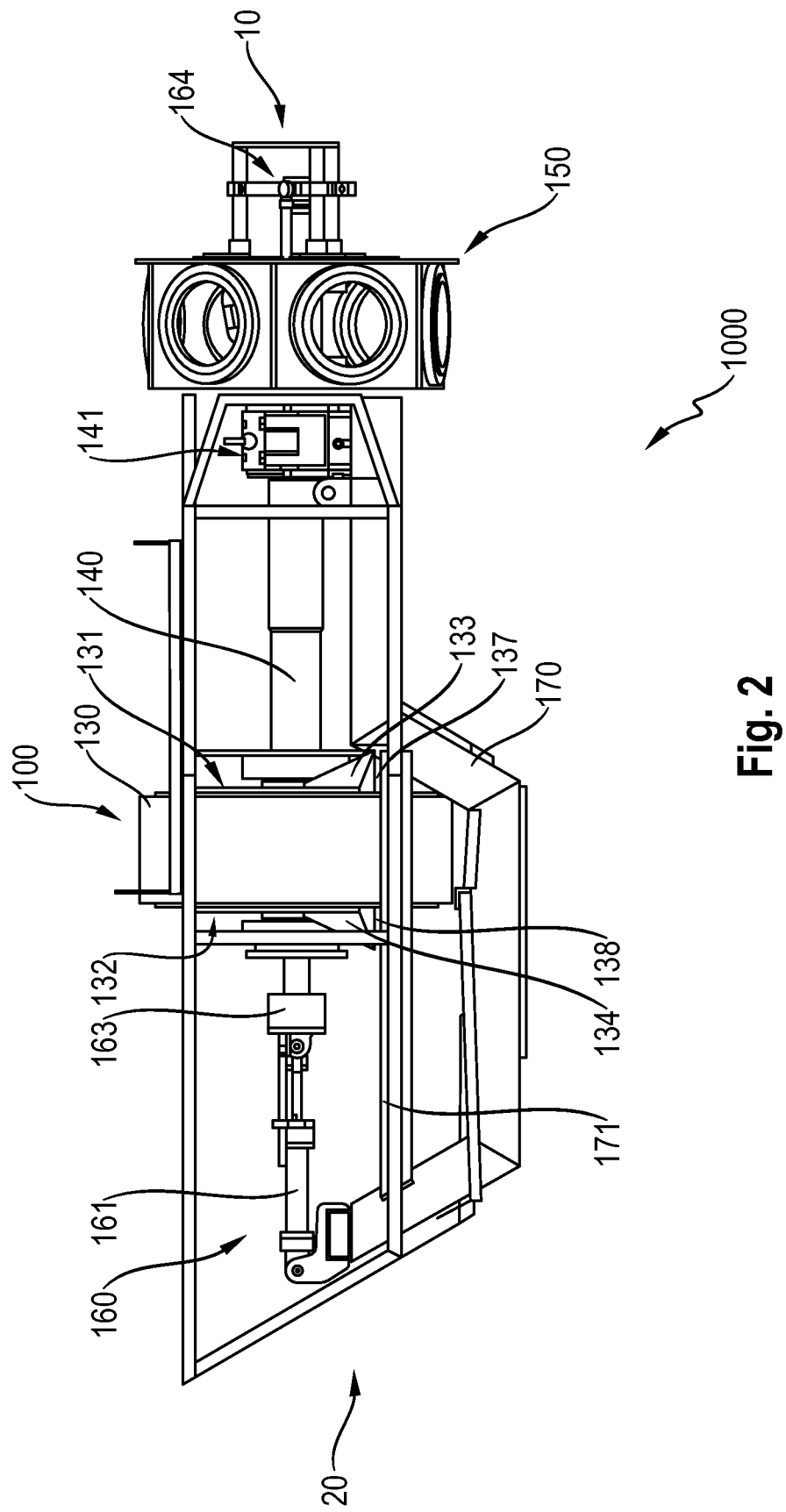
FIG. 2 a side view of a wind turbine according to the present invention.

As better seen in FIG. 2, the generator 100 further comprises a front generator housing fastening device 133 and a rear generator housing fastening device 134. The front generator housing fastening device 133 can be seen particularly well in FIG. 3. The rear generator housing fastening device 134 can be seen particularly well in FIG. 4.

The generator housing fastening devices 133 and 134 connect the generator housing 130 to a housing 170 of the wind turbine 1000. As can be seen in particular in FIGS. 2 to 4, the housing 170 has a cage structure. In this case, the housing 170 is constructed from several bars in a cage-like resp. scaffold-like manner. The housing 170 also serves to arrange the main shaft 140 and the generator 110 in a composite component, which can then in turn be attached to a nacelle of the wind turbine 1000.

Thus, the housing 170 has the purpose of arranging the individual components (for example, generator 110, front main shaft bearing 141 and main shaft 140) relative to each other. For this, as can be seen in particular below the front main shaft bearing 141 in FIG. 4, the housing 170 may further comprise one or more base plates on which the components are arranged (in this case the front main shaft bearing 141).

In particular, the generator housing fastening devices 133 and 134 connect the generator housing 130 to the housing 170 of the wind turbine 1000 via support devices 137 and 138. The support devices 137 and 138 are thus arranged between the housing 170 and the generator housing fastening devices 133 and 134. More generally, the support devices 137 and 138 are arranged between the housing 170 and the generator housing 130 (see schematic diagram in FIG. 1). The support devices 137 and 138 are preferably configured as elastomeric bearings.

As shown in the figures, a front support device 137 and a rear support device 138 are provided. The front support device 137 is connected to the front generator housing fastening device 133 and the rear support device 138 is connected to the rear generator housing fastening device 134. This also means that the front support device 137 can be arranged in front of (i.e. towards the frontside 10) the generator housing 130, as seen in the axial direction. Correspondingly, the rear support device 138 can also be arranged behind (i.e. towards the rearside 20) the generator housing 130, as seen in the axial direction. This enables a particularly reliable holding of the generator 100. In addition, a balanced force flow can be achieved.

Basically, the force flow is from the main shaft 140 to the base portion 111 of the generator rotor 100, to the front or rear generator bearing 135 or 136, to the generator housing 130 resp. a frontside 131 or a rearside 132 thereof. Further, the force flow extends to the front resp. rear generator housing fastening device 133 resp. 134 and then further to the front resp. rear support device 137 resp. 138. From here, the force flow then extends to the housing 170.

Figure 4:
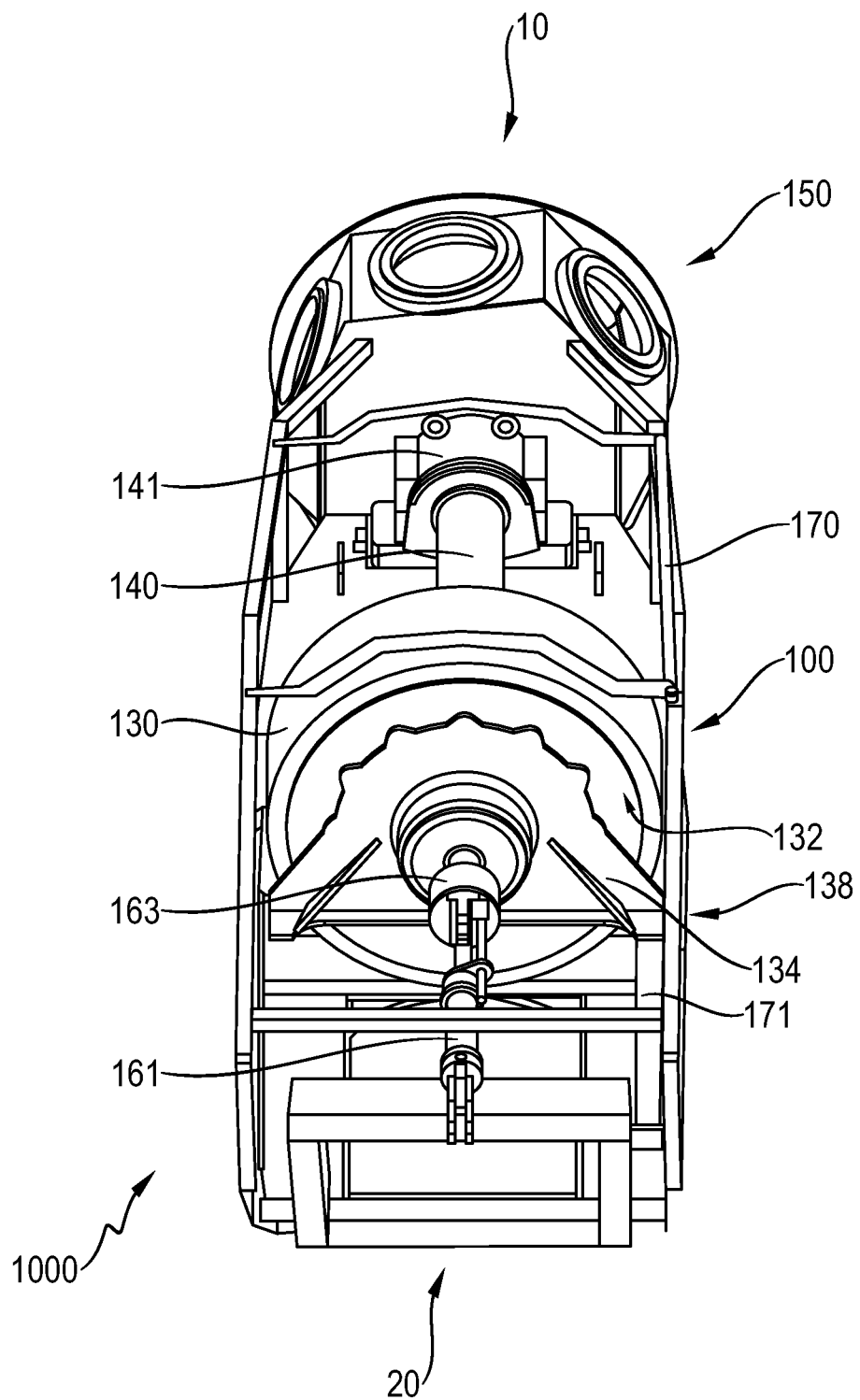
FIG. 4 a view of the wind turbine according to the present invention from a rearside.

As can be seen in particular in FIG. 4, the rear generator housing fastening device 134 is configured to extend outwardly when viewed from the generator housing 130. In other words, it extends towards the two long sides of the housing 170. Thereby, the long sides are understood to be the long sides of the housing 170 extending from the frontside 10 to the rearside 20. The fastening device 134 thus extends towards a first long side and a second long side of the housing 170 (to the left and to the right in FIG. 4).

Thus, more than one rear support devices 138 can also be arranged. Preferably, at least one rear support device 138 is arranged on each longitudinal side of the housing 170.

The same applies to the front generator housing fastening device 133, so that more than one front support device 137 can be arranged. In particular, two front support devices 137 can be provided, which are arranged on the two longitudinal sides of the housing 170.

Particularly preferably, four support devices 137, 138 are arranged around the generator housing 130. Thereby, two front support devices 137 (left and right) are arranged in front of the generator housing 130 and two rear support devices 138 (left and right) are arranged behind the generator housing 130.

Figure 3:
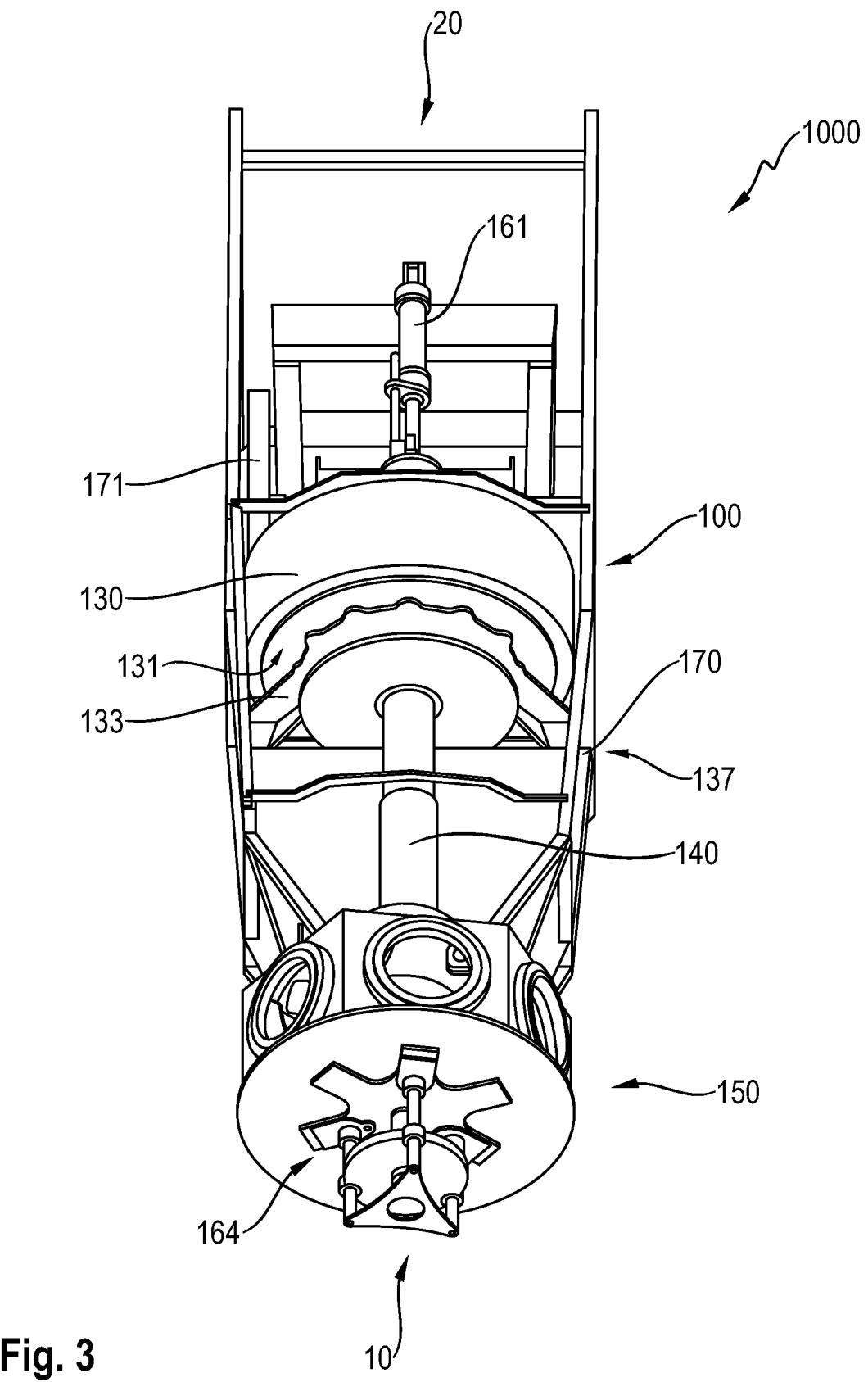
FIG. 3 a view of the wind turbine according to the present invention from a frontside.

As can be seen in the figures, the wind turbine 1000 further comprises a pitch device 160. As can be seen in FIG. 3, the pitch device 160 comprises a pitch adjustment 164, which is arranged at the frontside 10 of the wind turbine 1000. This is used to adjust the pitch of the rotor blades 151. The pitch adjustment 164 is connected to a pitch cylinder 161 via a pitch rod 162. The pitch cylinder 161 is used to control the pitch adjustment 164.

The pitch cylinder 161 is arranged on the rearside 20 of the wind turbine 1000 together with a rotary guide 163, as can be seen in particular in FIG. 4.

As can be seen in FIG. 1, the pitch rod 162 extends through the main shaft 140. Therefore, the main shaft 140 is configured as a hollow shaft. The pitch rod 162 is also configured to be strong enough to support the rotor head 150 and the main shaft 140 in case the main shaft 140 breaks.

The disassembly of the generator 110 can be seen particularly well in FIG. 4. First, the pitch cylinder 161 (and the rotation guide 163) are removed. Then the front generator rotor fastening device 112, the rear generator rotor fastening device 113, the at least one front support device 137 and the at least one rear support device 138 are loosened.

Then, a main shaft holder 142 indicated in FIG. 1 is activated. If the generator 110 is disassembled from the main shaft 140 without activating the main shaft holder 142, a rear portion (towards the rearside 20) of the main shaft 140 will no longer be held. Due to the weight of the rotor head 150 and the rotor blades 151, the main shaft 140 would then tilt forward. To prevent this, the main shaft holder 142 is provided.

When the main shaft holder 142 is activated and holds the main shaft 140 in position, the generator 110 can be pushed or pulled off from the main shaft 140. To facilitate this operation, the housing 170 comprises a housing rail 171 (see for example FIG. 4) on which the generator 110 can be pulled from the main shaft 140. The generator 110 is therefore still supported and can be moved in a controlled manner.

Overall, the illustrated generator 110 and the illustrated wind turbine 1000 provide improvements that have a positive impact on manufacturing, assembly, maintenance and servicing.

The invention claimed is:

1. A generator for a direct driven wind turbine configured to convert kinetic energy of a main shaft of the wind turbine into electrical energy,
   wherein the generator comprises a generator rotor connectable to the main shaft of the wind turbine and a generator stator,
   wherein the generator comprises a generator housing on which the generator stator is arranged,
   wherein the generator housing comprises a front side facing towards a rotor head of the wind turbine in an installed state of the generator and a rear side facing away from the rotor head in the installed state of the generator,
   wherein the generator further comprises at least one front generator bearing arranged at the front of the generator housing and a rear generator bearing arranged at the rear of the generator housing,
   wherein the front and the rear generator bearings are configured to support the main shaft on the generator housing in the installed state of the generator,
   wherein the generator comprises at least one support device which is attached directly to the generator housing and which is configured to support the generator housing on a housing of the wind turbine in the installed state.

2. The generator according to claim 1,
   wherein the front and rear generator bearings are configured as floating bearings.

3. The generator according to claim 1,
   wherein the generator rotor comprises a hollow cylindrical base portion comprising an inner peripheral surface and an outer peripheral surface.

4. The generator according to claim 3,
   wherein the generator rotor is formed in one piece with the hollow cylindrical base portion.

5. The generator according to claim 3,
   wherein an inner peripheral surface of the front generator bearing and an inner peripheral surface of the rear generator bearing come into contact with the outer peripheral surface of the hollow cylindrical base portion.

6. The generator according to claim 3,
   wherein the generator further comprises a front generator rotor fastening device and a rear generator rotor fastening device which are arranged at axial end portions of the hollow cylindrical base portion.

7. The generator according to claim 6,
   wherein the front generator rotor fastening device and the rear generator rotor fastening device are configured as clamping devices.

8. The generator according to claim 1,
Wherein the at least one support device is an elastomeric bearing.

9. The generator according to claim 1,
wherein a front support device is arranged at the frontside of the generator housing and a rear support device is arranged at the rearside of the generator housing.

10. The generator according to claim 9,
wherein the front support device is connected to the frontside of the generator housing via a front generator housing fastening device, and
wherein the rear support device is connected to the rearside of the generator housing via a rear generator housing fastening device.

11. A direct driven wind turbine comprising:
a generator according to claim 1;
a main shaft which transmits rotation of a rotor head to the generator; and
a housing on which the main shaft and the generator are supported.

12. The direct driven wind turbine according to claim 11, further comprising a front main shaft bearing which is arranged adjacent to the rotor head and which is configured to support the main shaft on the housing.

13. The direct driven wind turbine according to claim 12, wherein the front main shaft bearing is configured as a fixed bearing.

14. The direct driven wind turbine according to claim 12, wherein the front and the rear generator bearing together form a rear main shaft bearing.

15. The direct driven wind turbine according to claim 11, wherein the wind turbine further comprises a main shaft holder configured to hold the main shaft in its position when the generator is disassembled.

16. The direct driven wind turbine according to claim 11, wherein the main shaft is configured as a hollow shaft.

17. The direct driven wind turbine according to claim 11, wherein the wind turbine comprises a pitch device.

18. The direct driven wind turbine according to claim 17, wherein the pitch device comprises a pitch cylinder, a pitch rod and a pitch adjustment, wherein the pitch adjustment is arranged adjacent to the rotor head and can be controlled by the pitch cylinder, and wherein the pitch rod connects the pitch cylinder with the pitch adjustment through the main shaft, which is configured as a hollow shaft.

19. A method for disassembling a generator from a main shaft of a direct driven wind turbine comprising:
loosening a front generator rotor fastening device and a rear generator rotor fastening device;
loosening at least one support device, preferably several support devices; and
sliding down the generator from the main shaft.

20. The method for disassembling a generator according to claim 19, further comprising:
activating a main shaft holder prior to sliding down the generator from the main shaft.

* * * * *